(12) United States Patent
Kato et al.

(10) Patent No.: US 7,774,136 B2
(45) Date of Patent: Aug. 10, 2010

(54) VEHICLE DISPLAY APPARATUS

(75) Inventors: Miki Kato, Kariya (JP); Yoshinori Watanabe, Obu (JP); Kiyotaka Taguchi, Kariya (JP); Hidehiko Kawakami, Nagoya (JP); Tsuneo Uchida, Okazaki (JP); Tetsuya Enokizaka, Nagoya (JP)

(73) Assignee: DENSO CORPORATION, Kariya (JP)

( * ) Notice: Subject to any disclaimer, the term of this patent is extended or adjusted under 35 U.S.C. 154(b) by 658 days.

(21) Appl. No.: 11/543,090

(22) Filed: Oct. 5, 2006

(65) Prior Publication Data
US 2007/0088501 A1    Apr. 19, 2007

(30) Foreign Application Priority Data
Oct. 13, 2005    (JP)    ............................. 2005-298913
Feb. 16, 2006    (JP)    ............................. 2006-039437

(51) Int. Cl.
*G01C 21/00* (2006.01)
*G01C 21/30* (2006.01)
*G01C 21/32* (2006.01)

(52) U.S. Cl. ...................................... 701/211; 701/200
(58) Field of Classification Search ................. 701/208, 701/1, 200, 207, 211, 212; 349/56, 61, 62, 349/65
See application file for complete search history.

(56) References Cited

U.S. PATENT DOCUMENTS

| | | | | |
|---|---|---|---|---|
| 4,555,694 A | * | 11/1985 | Yanagishima et al. | 340/524 |
| 5,757,268 A | * | 5/1998 | Toffolo et al. | 340/461 |
| 5,920,256 A | * | 7/1999 | Toffolo et al. | 340/461 |
| 6,285,298 B1 | * | 9/2001 | Gordon | 340/945 |
| 6,373,472 B1 | * | 4/2002 | Palalau et al. | 345/173 |
| 6,542,146 B1 | * | 4/2003 | Toffolo et al. | 345/156 |
| 2004/0189193 A1 | * | 9/2004 | Ishii et al. | 313/506 |
| 2005/0119799 A1 | * | 6/2005 | Dupont et al. | 701/1 |
| 2008/0150709 A1 | * | 6/2008 | Yamamoto et al. | 340/441 |

FOREIGN PATENT DOCUMENTS

| | | |
|---|---|---|
| DE | 19947506 A1 | 4/2001 |
| JP | B2-8-14500 | 2/1996 |
| JP | A-11-51686 | 2/1999 |
| JP | A-2004-157434 | 6/2004 |
| JP | A-2004-251722 | 9/2004 |

* cited by examiner

*Primary Examiner*—Khoi Tran
*Assistant Examiner*—Stephen Holwerda
(74) *Attorney, Agent, or Firm*—Posz Law Group, PLC

(57) ABSTRACT

When an accessory switch of a vehicle is turned on, a TFT display device in an instrument panel is in a magnified display mode, where a navigation image is displayed in a magnified area of a navigation display area with no meter images displayed. A driver is therefore allowed to attentively view the navigation image in order to perform a route set or to change scales of a displayed map. When the driver further turns on an ignition switch, the magnified display mode is switched to a normal display mode. In the normal display mode, a meter display area and a vehicle state display area coexist with the navigation display area in the TFT display device; a navigation image is displayed in a normal area of the navigation display area with a meter image, e.g., a speed meter image, and a warning indicator image displayed simultaneously.

27 Claims, 8 Drawing Sheets

VEHICLE DISPLAY APPARATUS

CROSS REFERENCE TO RELATED APPLICATION

This application is based on and incorporates herein by reference Japanese Patent Applications No. 2005-298913 filed on Oct. 13, 2005 and No. 2006-39437 filed on Feb. 16, 2006. This application is also related to U.S. application Ser. No. 11/543,091 entitled "VEHICLE DISPLAY APPARATUS," filed on Oct. 5, 2006.

FIELD OF THE INVENTION

The present invention relates to a vehicle display apparatus that is placed near a driver and displays visual information about a meter and navigation.

BACKGROUND OF THE INVENTION

A navigation apparatus outputs visual information such as map, route, and facility information. Generally, the visual information is displayed on a display apparatus such as a liquid crystal display provided for a vehicle's center console. In this manner, the visual information is transmitted to the driver. Such display apparatus provided for the center console necessitates the driver to frequently move his or her line of sight. The driver may overlook the information displayed on the display apparatus.

To solve this problem, the proposed technologies display navigation images in an instrument panel (see patent documents 1, 2, and 3). For example, the technology disclosed in Patent Document 1 provides a display apparatus, which uses a whole instrument panel without a mechanical meter. The display apparatus displays a needle-type meter image (analog meter image). The display apparatus displays a navigation image as well as the meter image, allowing a driver to view both images with minimal movement of his or her line of sight.

The technology disclosed in Patent Document 2 also provides a display apparatus in an instrument panel. The display apparatus displays both a digital meter image and a navigation image. Also in this case, a driver can view the meter image and the navigation image with minimal movement of his or her line of sight.

The technology disclosed in Patent Document 3 provides a liquid crystal display apparatus between mechanical meters. The liquid crystal display apparatus displays a navigation image. Also in this case, a driver can view the meter indication and the navigation image with minimal movement of his or her line of sight within the same instrument panel.

Patent Document 1: JP-2004-157434 A
Patent Document 2: JP-H11-51686 A
Patent Document 3: JP-2004-251722 A The above-mentioned technologies disclose or suggest no consideration for a time sequence to display the navigation image in the instrument panel in relation to the meter image or indication.

For instance, the navigation image includes a map display window and a route guidance window. The user pays close attention to the navigation image when designating a destination to set a route, when completing setting of the route to the destination displayed on the screen, or when viewing the detailed map.

When both the meter image or the like and the navigation image are displayed simultaneously, the driver may less attentively recognize the navigation image. Further, a mechanical meter may turn on a light source for illuminating a needle or dial any time day and night. When both the navigation image and the meter indication of the mechanical meter are simultaneously displayed, the driver may also less attentively recognize the navigation image.

SUMMARY OF THE INVENTION

It is an object of the present invention to provide a vehicle display apparatus causing a navigation image to be more attentively recognized when the navigation image and a meter image or the like are displayed in a mixed manner in an instrument panel.

According to an aspect of the present invention, a vehicle display apparatus is provided as follows. Display means is provided in an instrument panel and includes (i) a navigation display area for displaying a navigation image and (ii) a meter display area for displaying a meter image. Control means starts to display the navigation image based on determining a first trigger, which appears when no navigation image and no meter image are displayed in the display means, and thereafter starts to display the meter image based on determining a second trigger.

According to another aspect of the present invention, a vehicle display apparatus is provided as follows. Display means is provided in an instrument panel and includes (i) a navigation display area for displaying a navigation image and (ii) a meter display area for displaying a meter image. Control means starts to display the navigation image based on determining a first trigger, which appears when no navigation image and no meter image are displayed in the display means, and thereafter starts to display the meter image with an interval of a specified time period, which starts from when displaying the navigation image is started based on determining the first trigger.

According to another aspect of the present invention, a vehicle display apparatus is provided as follows. A light source is turned on for illuminating a mechanical meter provided in an instrument panel. Display means is provided in the instrument panel and includes a navigation display area for displaying a navigation image. Control means starts to display the navigation image based on determining a first trigger, which appears when no navigation image is displayed without the light source turned on, and thereafter turns on the light source based on determining a second trigger.

According to another aspect of the present invention, a vehicle display apparatus is provided as follows. A light source is turned on for illuminating a mechanical meter provided in an instrument panel. Display means is provided in the instrument panel and includes a navigation display area for displaying a navigation image. Control means starts to display the navigation image based on determining a first trigger, which appears when no navigation image displayed without the light source turned on, and thereafter turns on the light source with an interval of a specified time period, which starts from when displaying the navigation image is started based on determining the first trigger.

According to yet another aspect of the present invention, a method for displaying images in an instrument panel in a vehicle is provided with the following: displaying a navigation image in a navigation display area based on determining a first trigger, which appears when no navigation image and no meter image are displayed; and displaying a meter image in a meter display area based on determining a second trigger that appears with an interval of a specified time period, which starts from when displaying the navigation image is started based on determining the first trigger.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Embodiments of the present invention will be described in further detail with reference to the accompanying drawings.

1. First Embodiment (Construction Description)

Figure 1:
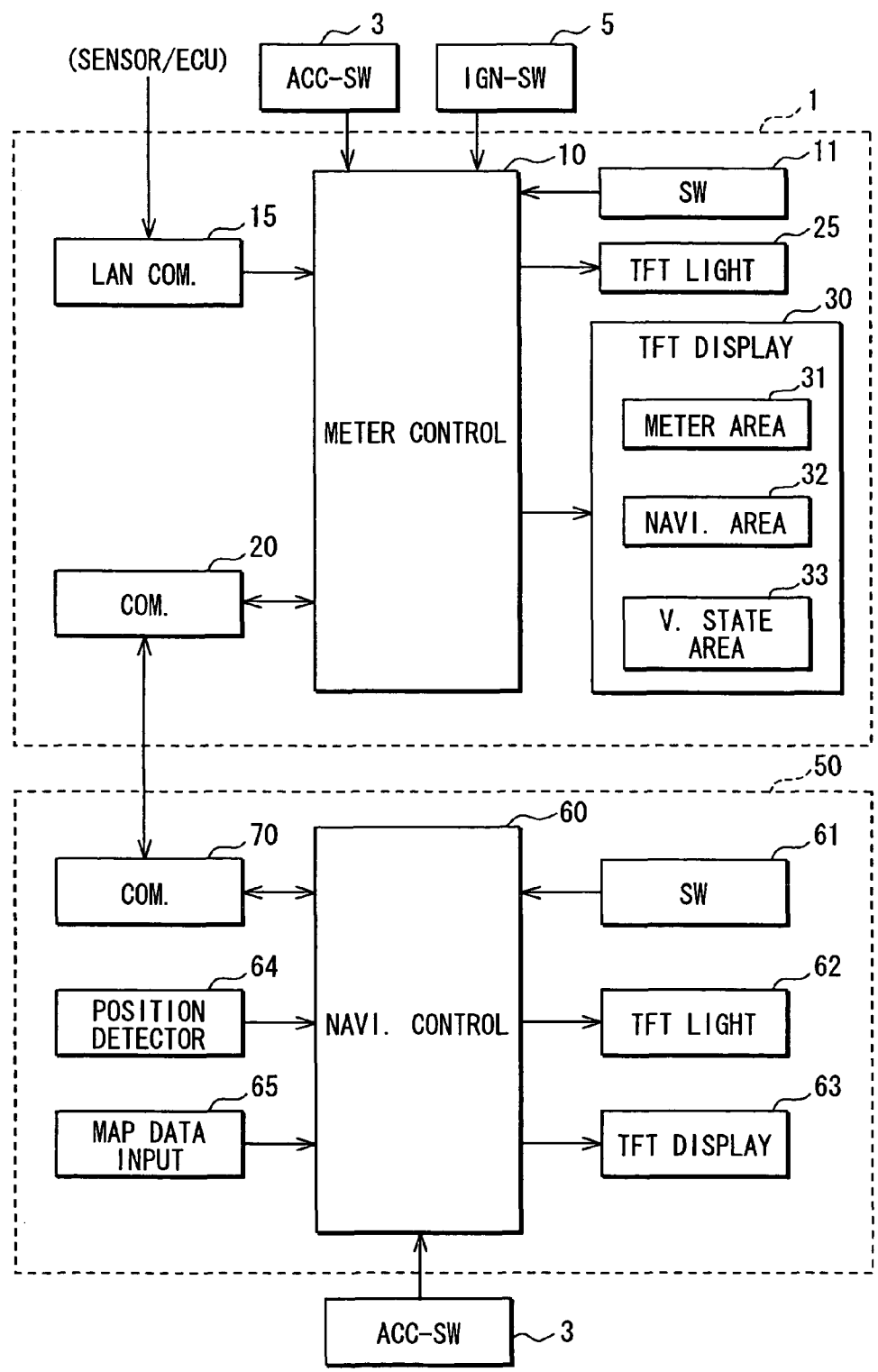
FIG. 1 is a block diagram showing an overview construction of a vehicle display apparatus and a navigation apparatus according to a first embodiment of the present invention.
Figure 2A:
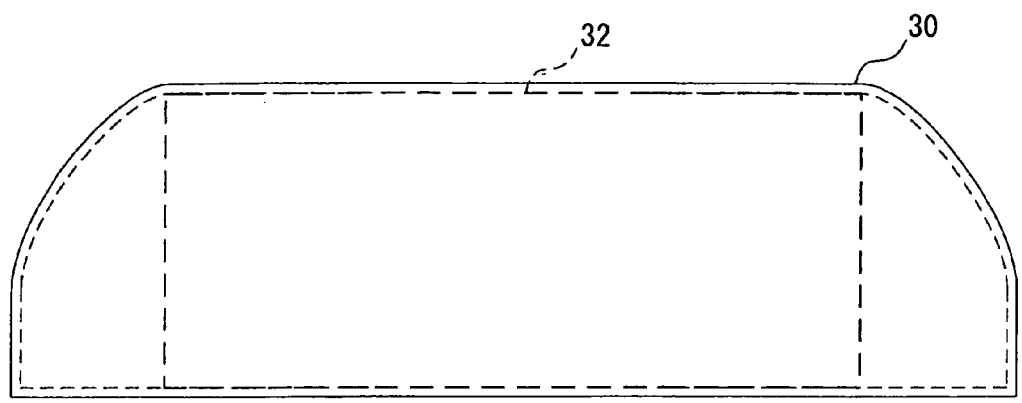
FIGS. 2A and 2B is a front view of the vehicle display apparatus according to the first embodiment.
Figure 2B:
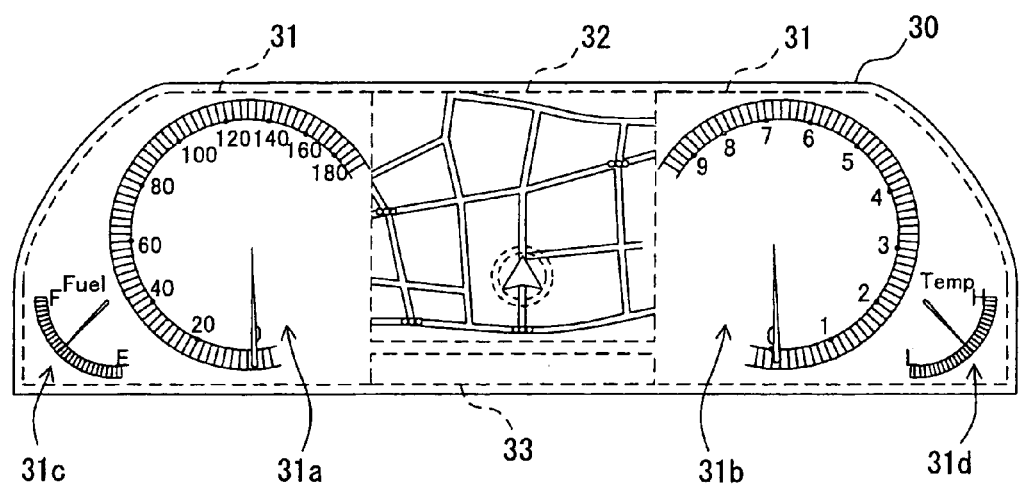

FIG. 1 is a block diagram showing an overview construction of a vehicle display apparatus 1 according to a first embodiment and a navigation apparatus 50 connected thereto. FIGS. 2A and 2B are front views of the vehicle display apparatus 1. The vehicle display apparatus 1 and the navigation apparatus 50 include the following components and are mounted on a vehicle for use. The vehicle display apparatus 1 will be first described.

<Construction of the Vehicle Display Apparatus 1>

The vehicle display apparatus 1 includes a meter control unit 10, an operation switch group 11, an interior LAN (Local Area Network) communication unit 15, a communication unit 20, a TFT (Thin Film Transistor) light source 25, and a TFT (Thin Film Transistor) display device 30.

The interior LAN communication unit 15 provides communication between various ECUs (Electronic Control Units) and alarm sensors connected to an interior LAN (not shown). The ECUs include an engine ECU and an AT (Automatic Transmission)-ECU, for example. The alarm sensors include a brake warning indicator, an oil pressure warning indicator, an exhaust temperature warning indicator, a battery warning indicator, an ABS (Antilock Brake System) warning indicator, an engine warning indicator, and a door warning indicator.

The communication unit 20 is connected to the navigation apparatus 50 to implement communication with the navigation apparatus 50. Specifically, the communication unit 20 is connected to a communication unit 70 of the navigation apparatus 50. The communication unit 20 chiefly receives image data for navigation images displayed on the TFT display device 30.

The TFT light source 25 is for the TFT display device 30. The TFT display device 30 is mounted in an instrument panel (not shown) and includes a liquid crystal display or an organic EL display. The TFT display device 30 has a color image display function. As shown in FIG. 2B, a display area of the TFT display device 30 can be divided into a meter display area 31, a navigation display area 32, and a vehicle state display area 33.

The meter display area 31 simulates an analog meter to display images representing a vehicle speed, engine revolution, fuel level, coolant temperature, and the like acquired from various ECUs (not shown) via the interior LAN communication unit 15. FIG. 2B shows the meter display area 31 according to the embodiment. Viewed from the driver, the left part of the meter display area 31 displays a speed meter image 31a and a fuel level meter image 31c. Viewed from the driver, the right part of the meter display area 31 displays a tachometer image 31b and a coolant temperature meter image 31d.

The navigation display area 32 displays navigation images acquired from the navigation apparatus 50 via the communication unit 20. For example, the navigation images include a map surrounding a current position, an icon representing the current position, and a guidance chart for route guidance. Although the detail will be explained later, the navigation display area 32 is magnified under a specified state to display a navigation image, as shown in FIG. 2A.

For example, the vehicle display apparatus 1 acquires alarm sensor states from various alarm sensors (not shown) via the interior LAN communication unit 15. These states provide information indicating whether or not an alarm is needed. When an alarm is needed, the vehicle state display area 33 displays the alarm as a warning indicator image (or an alert image) corresponding to the alarm sensor. The warning indicator image diagrammatically represents the warning indicator such as the brake warning indicator, the oil pressure warning indicator, the exhaust temperature warning indicator, the battery warning indicator, the ABS warning indicator, the engine warning indicator, and the door warning indicator. The image itself is well known and a detailed description is omitted.

The operation switch group 11 includes a touch panel also used as the display surface of the TFT display device 30 and mechanical key switches provided around the TFT display device 30. The operation switch group 11 is used to input various instructions from a driver. The touch panel and TFT display device 30 are integrally layered. The touch panel may be available as any one of pressure sensitive, electromagnetic induction, and capacitance systems, or a combination of these.

The meter control unit 10 chiefly includes a known microcomputer composed of a CPU, ROM, RAM, SRAM, I/O, and a bus line connecting these components. The meter control unit 10 performs various processes based on programs stored in the ROM and the RAM. For example, the meter control unit 10 receives data from various ECUs via the interior LAN communication unit 15 and allows the TFT display device 30 to display the vehicle speed, engine revolution, fuel level, and coolant temperature in an analog fashion on the meter display area 31. The meter control unit 10 uses image data transmitted from the navigation apparatus 50 and allows the TFT display device 30 to display a map image on the navigation display area 32. The meter control unit 10 acquires alarm sensor states from the various alarm sensors via the interior LAN communication unit 15 and allows the TFT display device 30 to display a warning indicator image indicating the contents of the alarm, when needed, on the vehicle state display area 33.

The meter control unit 10 is also connected to an accessory (ACC) switch 3 and ignition (IGN) switch 5. In this embodiment, when the ACC switch 3 is turned on by the ignition key operated by the driver, the vehicle display apparatus 1 is supplied with power and its components become ready for operation. Turning on the IGN switch 5 is not limited to the operation of rotating the ignition key. When a user owns the so-called Smart Key, he or she may turn on the IGN switch by rotating a knob or pressing a button.

<Construction of the Navigation Apparatus 50>

The navigation apparatus 50 includes a navigation control unit 60, an operation switch group 61, a TFT light source 62, a TFT display device 63, a position detector 64, a map data input device 65, and a communication unit 70. The operation switch group 61 is used for a user to enter various instructions. The position detector 64 detects a vehicle's current position. The map data input device 65 supplies data from a map storage medium that records map data and voice data. The communication unit 70 provides a function to communicate with the vehicle display apparatus 1.

The operation switch group 61 includes a touch panel also used as the display surface of the TFT display device 63 and mechanical key switches provided around the TFT display device 63. The operation switch group 61 is used to input various instructions from a driver.

The TFT light source 62 is for the TFT display device 63. The TFT display device 63 is mounted in a center console (not shown) and includes a liquid crystal display or an organic EL display. The TFT display device 63 has a color image display function. A mark indicating the current location can be specified from the vehicle's current position detected by the position detector 64 and map data supplied from the map data input device 65. The TFT display device 63 can display that mark in overlap with additional data such as a guiding route to a destination, names, spots, and various facility marks. The facility guidance can be also displayed.

The position detector 64 is provided with a GPS (Global Positioning System) receiver, a gyroscope, and a distance sensor. The GPS receiver receives radio waves from an artificial satellite for GPS via a GPS antenna (not shown) and outputs a received signal. The gyroscope detects the magnitude of rotational motion applied to a vehicle. The distance sensor detects a traveled distance based on the acceleration or the like in the forward and backward directions of the vehicle. The navigation control unit 60 calculates the vehicle position, orientation, speed, and the like based on output signals from these sensors.

The communication unit 70 is connected to the vehicle display apparatus 1 to implement communication with the vehicle display apparatus 1. Specifically, the communication unit 70 is connected to the communication unit 20 of the vehicle display apparatus 1. The communication unit 70 chiefly transmits image data for images displayed on the vehicle display apparatus 1.

The map data input device 65 is supplied with various data from a map data storage medium (not shown) such as a hard disk or DVD-ROM. The map data storage medium stores map data (node data, link data, cost data, background data, road data, name data, mark data, intersection data, facility data, and the like), audio data for guidance, voice recognition data, and the like. These data may be supplied via a network instead of using the map data storage medium.

The navigation control unit 60 is mainly constructed of a known microcomputer including a CPU, ROM, RAM, SRAM, I/O, and a bus line connecting these components. The navigation control unit 60 performs various processes based on programs stored in the ROM and the RAM. As an example, the navigation control unit 60 calculates the vehicle's current position as a set of coordinates and a traveling direction based on signals detected by the position detector 64. The navigation control unit 60 allows the TFT display device 63 to display a map and the like surrounding the current position read through the map data input device 65. As another example, the navigation control unit 60 performs a route calculation process to calculate an optimum route from the current position to a destination based on map data and the destination. The map data is stored in the map data input device 65. The destination is determined in accordance with operations of the operation switch group 61. As still another example, the navigation control unit 60 performs a route guidance process to guide the route by allowing the TFT display device 63 to display the calculated route.

The navigation control unit 60 also connects with an accessory (ACC) switch 3. When the driver operates the ignition key to turn on the ACC switch 3, the navigation apparatus 50 is supplied with the power to enable the components thereof to operate (i.e., to enter an ACC power supply state).

(Description of Operations and Effects) Operations of the vehicle display apparatus 1 will be described with reference to a time chart in FIG. 3. The following description contains only necessary operations of the navigation apparatus 50 in relation to the vehicle display apparatus 1.

Figure 3:
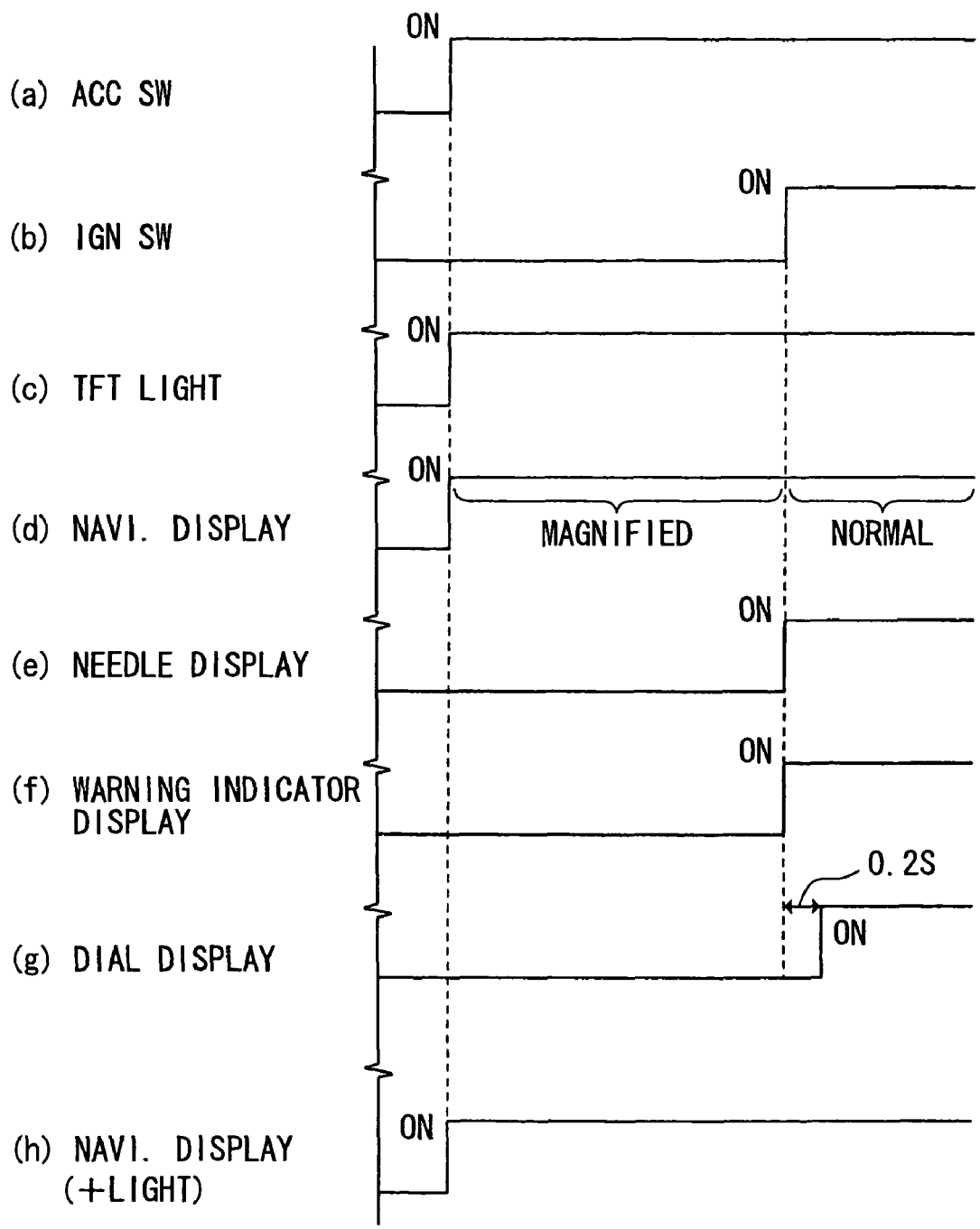
FIG. 3 is a time chart showing an operation of the vehicle display apparatus according to the first embodiment.

When the driver operates the ignition key to turn on the ACC switch or to enter an ACC power supply state (see (a) in FIG. 3), the vehicle display apparatus 1 and the components of the navigation apparatus 50 become ready for operation. The meter control unit 10 turns on the TFT light source 25 (see (c) in FIG. 3) and starts displaying a navigation image on the TFT display device 30 (see (d) in FIG. 3). In contrast, the navigation control unit 60 turns on the TFT light source 62 and starts displaying a navigation image on the TFT display device 63 (see (h) in FIG. 3).

When the meter control unit 10 starts displaying the navigation image, the navigation display area 32 is magnified in the TFT display device 30 from an area (corresponding to "normal display mode" or "normal display") shown in FIG. 2B to that (corresponding to "magnified display mode" or "magnified display") shown in FIG. 2A. In FIG. 2B, the TFT display device 30 needs to include the meter display area 31, navigation display area 32, and vehicle state display area 33. That is, the meter display area 31 needs to display the speed meter image 31a, tachometer image 31b, a fuel level meter image 31c, and coolant temperature meter image 31d; the vehicle state display area 33 needs to display a warning indicator image. The navigation display area 32 therefore needs to be relatively small. In contrast, in FIG. 2A, the navigation image alone is displayed on the navigation display area 32, which is magnified as much as possible. In other words, in FIG. 2A, areas prepared for the meter display area 31 and vehicle state display area 33 are used for the navigation display area 32 in the magnified display mode.

When the driver further operates the ignition key to turn on the ignition (IGN) switch (i.e., enter an IGN power supply state) (see (b) in FIG. 3), the display area on the TFT display device 30 is changed from the "magnified display mode," where the navigation display area 32 is magnified, to the "normal display mode," where the meter display area 31, navigation display area 32, and vehicle state display area 33 coexist. The meter display area 31 starts to display the meter images (speed meter image 31a, tachometer image 31b, a fuel level meter image 31c, and coolant temperature meter image 31d); the vehicle state display area 33 starts to display a warning indicator image (see (f) in FIG. 3).

With respect to the display in the meter display area 31, needles are displayed earlier than dials (or dial plates). When the IGN switch 5 is turned on (see (b) in FIG. 3), only needles of the images 31a, 31b, 31c, and 31d are displayed (see (e) in FIG. 3). Dials or dial plates are then displayed with an interval of a specified period (e.g., 0.2 seconds) (see (g) in FIG. 3).

Thus, the navigation display area 32 is displayed on a magnified area in the TFT display device 30 (or in the magnified display) in the state where the ignition key is inserted into a key cylinder and rotated to turn on the ACC switch 3. The user can use this magnified display, e.g., to designate a destination for route guidance or view a detailed map. Here, the driver can perform an operation for setting a destination or for enlarging or reducing map scales via the operation switch group 11. In this operation, it is favorable that the driver can pay more attention to the navigation image. Since no meter images are displayed at this timeframe (corresponding to a magnified display in FIG. 3), the driver can more attentively recognize the navigation image, which provides an advantage.

For instance, when setting of the destination is completed and attending to the navigation image then becomes unnecessary, the driver may further rotate the ignition key to turn on the IGN switch 5 to display meter images. In other words, when the driver wants to attend to viewing the magnified display or the navigation image shown in FIG. 2A, the driver keeps the ACC switch 3 turned on without the IGN switch 5 turned on.

Further, a visual effect may be considered with respect to the meter images 31a to 31d. Namely, after displaying the needles, the dials of the meter images 31a to 31d are thereafter displayed with an interval of a specified time period (e.g., 0.2 seconds). This increases a visual effect to cause a driver to attentively view the meter images 31a to 31d.

The warning indicator image is once entirely displayed to check the initial state and turned off thereafter unless actually needed. When the IGN switch 5 remains turned on for a specified time period (e.g., three seconds), the warning indicator image is automatically turned off (or erased) upon expiration of that time period. Further, when the engine is started, the warning indicator image is automatically turned off. A known technology can apply to a procedure after the warning indicator image is displayed and this procedure is not feature of the present invention, so the detail explanation will be omitted.

(Modifications)

(1) In the above explanation, a first trigger to perform a magnified display of a navigation image is turning on of the ACC switch 3, while a second trigger to return the magnified display to a normal display while starting to display the meter images and warning indicator image is turning on of the IGN switch 5. These are examples of two switches, which turn on individually in a time sequence such as "ACC switch 3 turning on→IGN switch 5 turning on" when a driver rides in a vehicle. Therefore, other two switches, which turn on in the time sequence when riding in a vehicle, can be substituted.

For instance, four switches of a door switch for detecting opening of a door, a key insertion switch for detecting an ignition key inserted to a key cylinder, an ACC switch, and an IGN switch are individually tuned on in this time sequence (door switch→insertion switch→ACC switch→IGN switch) in a procedure of riding in a vehicle. Assume that a first specified operation is defined as the first trigger to perform a magnified display of a navigation image and a second specified operation is defined as the second trigger to return the magnified display to a normal display while starting to display the meter images and warning indicator image. Here, the first specified operation can be assigned to turning on a certain switch among the door switch, key insertion switch, and ACC switch, while the second specified operation can be assigned to, within the three remaining switches, turning on another switch, which turns on later than the certain switch. Of course, another switch other than the above switches can be used for defining the first or second specified operation.

Furthermore, the trigger defined by using switches can be replaced with a trigger state defined by detecting a specified state of the vehicle. Means for detecting a state of the vehicle is, for instance, a sensor for detecting that a driver is seated on a seat. For instance, a first specified state to trigger performing a magnified display of a navigation image is assigned to a state that a seat sensor detects that a driver is seated on a driver's seat, while a second specified state to trigger returning to the normal display or the like is assigned to a state that the IGN switch is turned on.

Furthermore, a first specified state can apply to a state that a door lock is detected, that a seat belt is fastened, or that closing of a door is detected (i.e., that opening of the door is detected without a key inserted, and then closing of the door is detected).

Furthermore, a second specified state can apply to a state that a parking brake is released, that an accelerator is stepped on, that a shift lever is manipulated, or that a vehicle speed exceeding zero is detected based on a speed sensor. The above states indicate a state that a vehicle is about to start or has just started.

Figure 4:
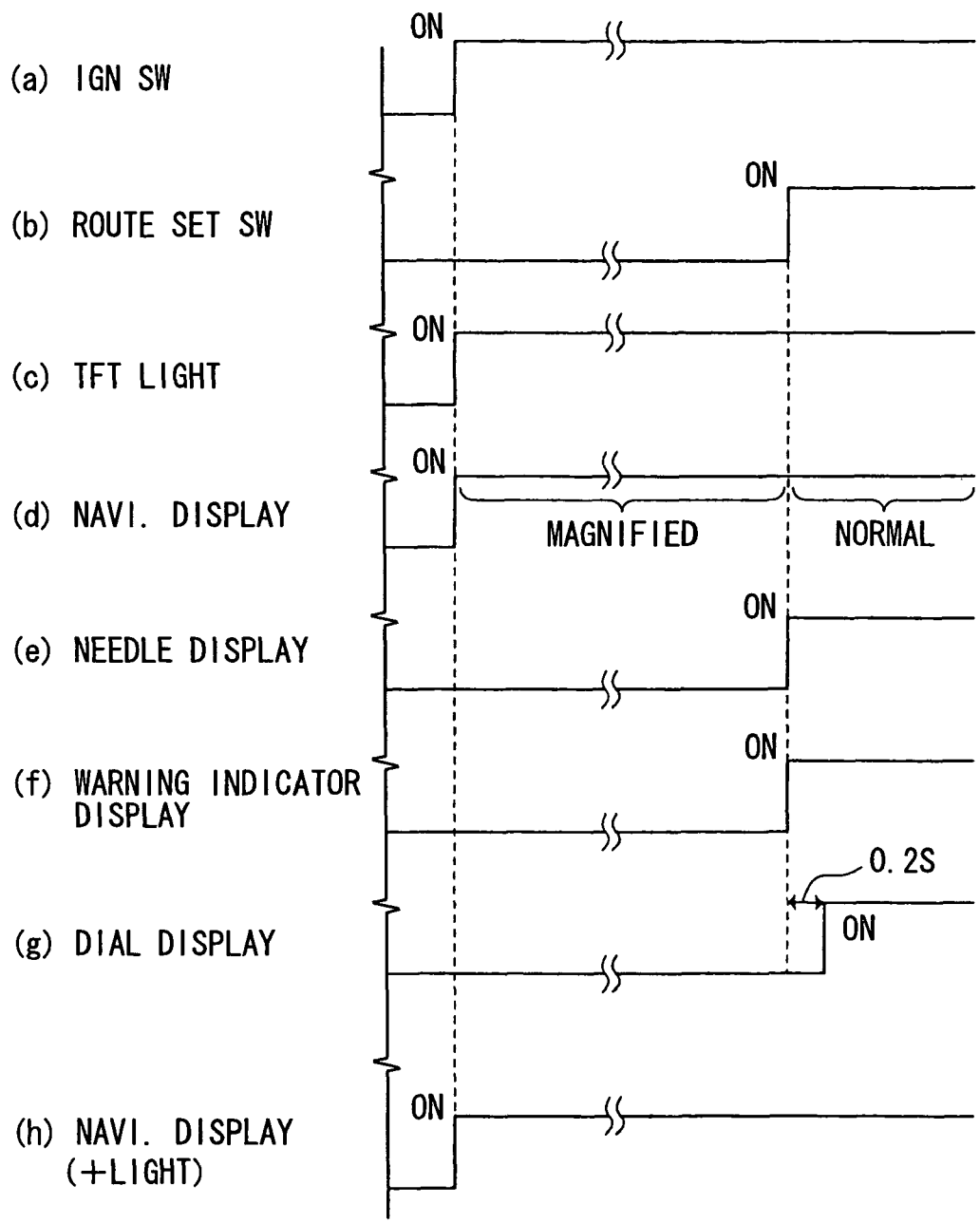
FIG. 4 is a time chart showing another operation of the vehicle display apparatus according to the first embodiment.

(2) In the above explanation, a first trigger to perform a magnified display of a navigation image is turning on of the ACC switch 3, while a second trigger to return the magnified display to a normal display while starting to display the meter images and warning indicator image is turning on of the IGN switch 5. The second trigger can include an operation below. For instance, when a specified instruction is inputted via the operation switch group 11, a magnified display may be changed to a normal display and the meter images and warning indicator image may appear at the same time. Operations of the vehicle display apparatus 1 will be described with reference to a time chart in FIG. 4.

For instance, an image of a route set window may be included in a magnified display of a navigation image in the navigation display area 32. A driver designates a destination in this route set window and then a route to the destination is displayed. At this time point, whether setting a route is completed or not is inquired to the driver. For instance, a switch image of "completion" appears in the window along with a guidance display "press 'completion' switch when the guide route is acceptable. "When the driver presses the "completion" switch image on a touch panel formed on the display surface of the TFT display device 30 as part of the operation switch group 11, the completion switch in the route set window turns on (see (b) in FIG. 4). The completion switch can be one of the mechanical switches of the operation switch group 11 surrounding the TFT display device 30 instead of that of the touch panel. Other parts in FIG. 4 excluding the completion switch in the route set window are similar to those in FIG. 3, so further explanation will be omitted.

Thus, an instruction indicating that setting a route is completed is accepted. This means no need to attentively further view the navigation image. The magnified display is therefore reduced to a normal display and the meter images and warning indicator image appear as shown in FIG. 2B.

In the above, although the completion of setting a route is one example of an instruction, another can substitute it. For instance, a detailed map may be displayed and an operation to return the detailed map to a normal map may be accepted via the operation switch group 11. This may indicate that a need to attentively view a navigation image decreases relatively. Thus, with the instruction returning to the normal map accepted, the magnified display may be stopped and the meter images and warning indicator image may be displayed as shown in FIG. 2B.

(3) In the above (2), the second trigger is assigned to a time point when or state that a specified instruction is accepted. For instance, a driver may only confirm an area surrounding a destination by scrolling a map without setting a route. In this case, an instruction indicating that setting a route is complete is never inputted. A second specified state to trigger starting to display the meter images and warning indicator image may be determined when a specified time period elapses without an instruction from a user accepted. Operations of this example will be described with reference to a time chart in FIG. 5. As shown in (b) in FIG. 5, the second specified state is determined when a specified time period elapses (or time-out is confirmed) without accepting an instruction after a scroll operation is performed.

(4) In the above explanation, the first and second triggers operated by a user are used to (i) perform a magnified display of a navigation image and (ii) return to a normal display while displaying the meter images and warning indicator image, respectively. This manner has an advantage that an intention of a user can be easily reflected on each of the triggers.

However, to display the meter images and warning indicator image, both the first trigger turning on the ACC switch 3 and the second trigger then turning on the IGN switch 5 are necessary. When decreasing such two operations, the following may be applied.

That is, a magnified display is performed when the ACC switch 3 is turned on, and then the magnified display is reduced to a normal display while displaying the meter images and warning indicator image with an interval of a specified time period. This specified time period may be suitable for a user to confirm the detail of a map, e.g., 30 seconds. Further, the first trigger can be alternatively turning on of the IGN switch 5 instead of turning on of the ACC switch 3.

Here, after the ACC switch 3 or IGN switch 5 is turned on, a magnified display of a navigation image and the meter images and warning indicator image are then automatically displayed with an interval of 30 seconds, which reduces the procedure of the operations.

Here, a necessary time for such as setting a route may change depending on a user. In such case, the second trigger may be preferably set to reflect the intention of a user; namely, turning on of the IGN switch 5 preferably causes the navigation image to return to a normal display while starting to display the meter images and warning indicator image.

Figure 6:
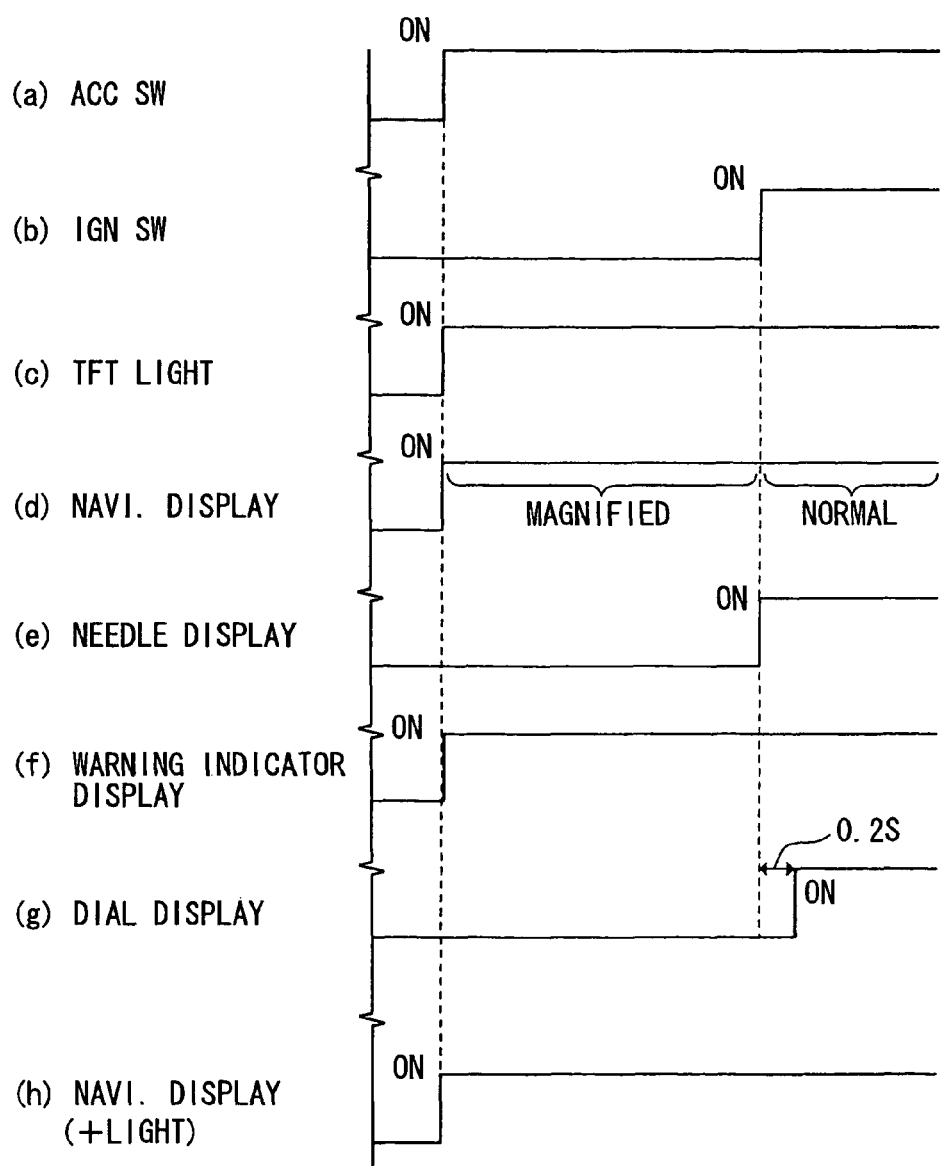
FIG. 6 is a time chart showing another operation of the vehicle display apparatus according to the first embodiment.

(5) Further, as shown in a time sequence in FIG. 6, a warning indicator image (or an alert image) can be displayed along with a navigation image when the ACC switch 3 is turned on. This enables a driver to know vehicle states as early as possible. In this case, the vehicle state display area 33, which is shown in FIG. 2B, may coexist with a magnified display of a navigation image in FIG. 2A. This vehicle state display area 33 requires a relatively small area, which may not interfere with displaying of the navigation image.

(6) The navigation apparatus 50 may be provided with a speaker (voice output unit) to add a voice guidance function, for example. Further, a microphone (voice input unit) may be provided to add a function that enables input of a voice instruction from a driver. In addition to the operation switch group 61, there may be a case of adding a function that allows a driver to operate a remote controller for instruction input. In this case, it is only necessary to provide a remote controller sensor that receives a signal from the remote controller operated by the driver. These considerations belong to known technologies and a detailed description is omitted.

2. Second Embodiment (Construction Description)

Figure 7:
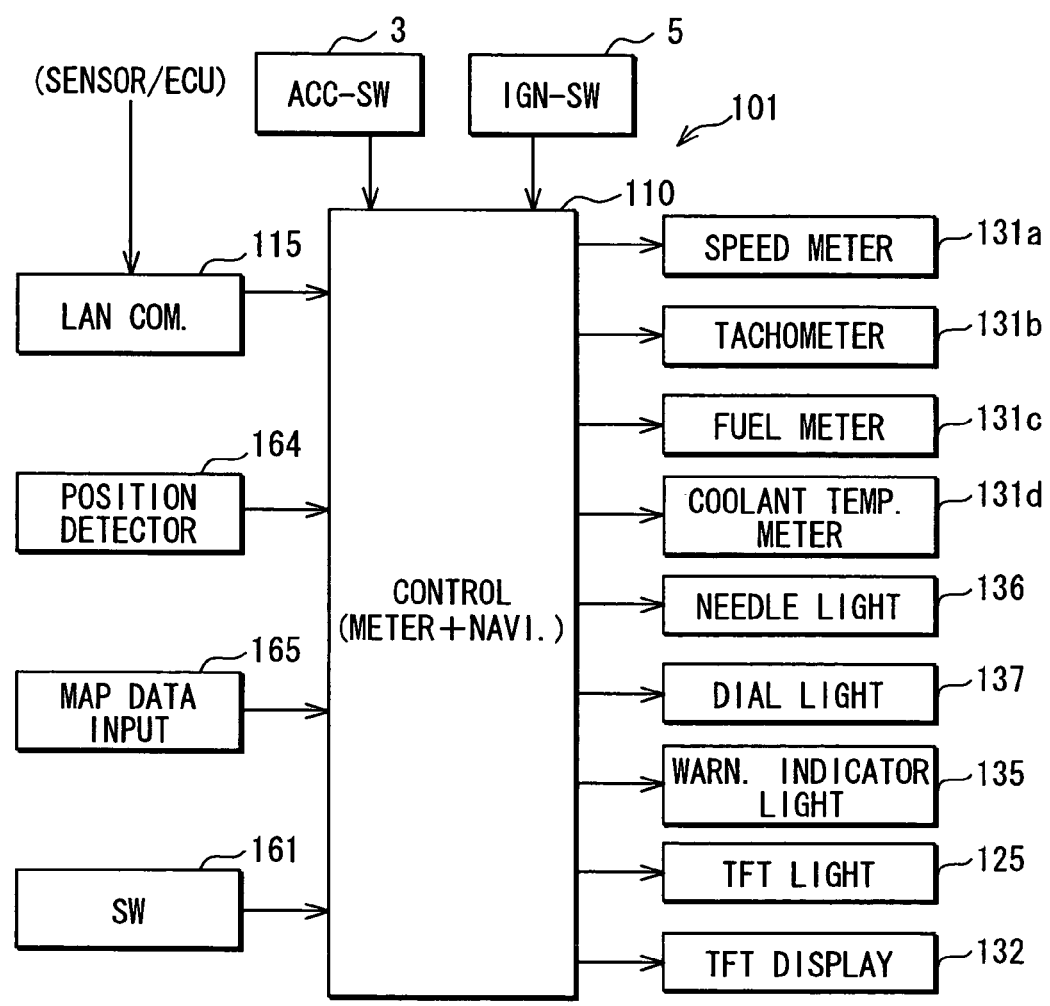
FIG. 7 is a block diagram showing an overview construction of a vehicle display apparatus according to a second embodiment of the present invention.
Figure 8:
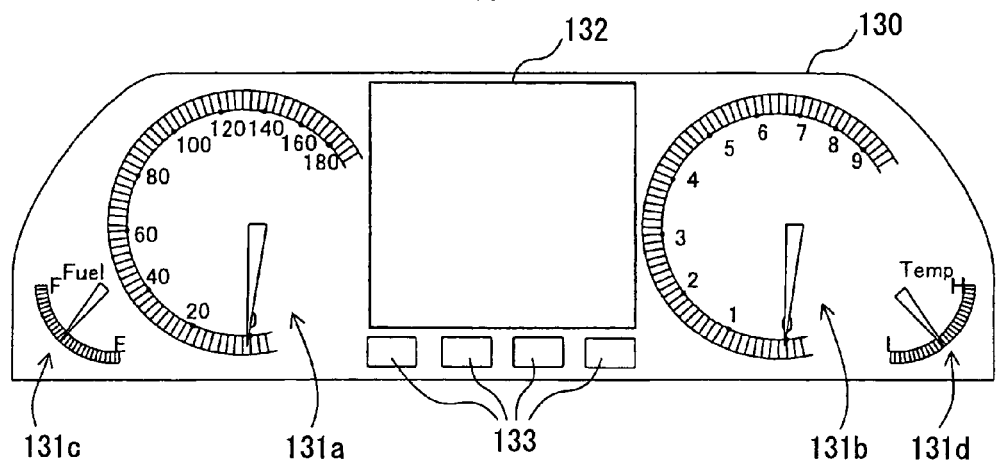
FIG. 8 is a front view of the vehicle display apparatus according to the second embodiment.

FIG. 7 is a block diagram showing an overview construction of a vehicle display apparatus 101 according to a second embodiment of the present invention. FIG. 8 is a front view of the vehicle display apparatus 101. The above-mentioned vehicle display apparatus 1 according to the first embodiment assumes a so-called digital meter that also displays the meter as an image. By contrast, the vehicle display apparatus 101 according to the second embodiment assumes a mechanical meter.

The vehicle display apparatus 101 includes a control unit 110, an interior LAN communication unit 115, a speed meter 131*a*, a tachometer 131*b*, a fuel meter 131*c*, a coolant temperature meter 131*d*, a needle light source 136, a dial light source 137, warning indicators 133 (see FIG. 8), a warning indicator light source 135, a TFT light source 125, a TFT display device 132, an operation switch group 161, a position detector 164, and a map data input device 165. The position detector 164 detects the vehicle's current position. The map data input device 165 supplies data from a map storage medium that records map data, voice data, and the like.

The interior LAN communication unit 115 provides communication between various ECUs and alarm sensors connected to an interior LAN (not shown). The ECUs include an engine ECU and an AT-ECU, for example. The alarm sensors include a brake warning indicator, an oil pressure warning indicator, an exhaust temperature warning indicator, a battery warning indicator, an ABS warning indicator, an engine warning indicator, and a door warning indicator.

The speed meter 131*a* indicates the vehicle speed and operates based on a signal from the control unit 110. The control unit 110 acquires the vehicle's speed information from a speed sensor (not shown) via the interior LAN communication unit 115. The control unit 110 supplies the speed meter 131*a* with a signal corresponding to the speed information.

The tachometer 131*b* indicates the engine revolution and operates based on a signal from the control unit 110. The control unit 110 acquires information about the engine revolution from an engine ECU (not shown) via the interior LAN communication unit 115 and supplies the tachometer 131*b* with a signal corresponding to the revolution information.

The fuel meter 131*c* indicates the fuel level and operates based on a signal from the control unit 110. A fuel tank is provided with a sensor (not shown) to detect the fuel level. The control unit 110 acquires the fuel level information from this sensor via the interior LAN communication unit 115 and supplies the fuel meter 131*c* with a signal corresponding to the fuel level information.

The coolant temperature meter 131*d* indicates the temperature of the engine coolant and operates based on a signal from the control unit 110. The control unit 110 acquires coolant temperature information from a sensor (not shown) for detecting the engine coolant temperature via the interior LAN communication unit 115. The control unit 110 outputs a signal corresponding to the coolant temperature information to the coolant temperature meter 131*d*.

The needle light source 136 is provided for illuminating individual needles of the meters 131*a*, 131*b*, 131*c*, and 131*d*. The light source can be various illuminators such as an LED.

Similarly to the needle light source 136, the dial light source 137 is provided for illuminating individual dials or dial plates of the meters 131a, 131b, 131c, and 131d. The warning indicators 133 include, for example, a brake warning indicator, an oil pressure warning indicator, an exhaust temperature warning indicator, a battery warning indicator, an ABS warning indicator, an engine warning indicator, and a door warning indicator. Each warning indicator 133 is provided with an indicator (or lamp) that represents each alarm content diagrammatically, alphabetically or numerically. The indicator itself follows the known technology and a detailed description is omitted.

The warning indicator light source 135 is provided for illuminating each of the above-mentioned warning indicators (or lamps) 133. The TFT light source 125 is provided for the TFT display device 132.

The TFT display device 132 is provided between the speed meter 131a and the tachometer 131b in the instrument panel. The TFT display device 132 includes a liquid crystal display or an organic EL display. The TFT display device 30 has a color image display function and displays navigation images (e.g., a map near the current position, an icon representing the current position, and a guidance chart for route guidance).

The operation switch group 161 includes a touch panel also used as the display surface of the TFT display device 132 and is used to input various instructions from a driver. The touch panel and the TFT display device 132 are integrally layered.

The position detector 164 is provided with a GPS (Global Positioning System) receiver, a gyroscope, and a distance sensor. The GPS receiver receives radio waves from an artificial satellite for GPS via a GPS antenna (not shown) and outputs a received signal. The gyroscope detects the magnitude of rotational motion applied to the vehicle. The distance sensor detects a traveled distance based on the acceleration or the like in the forward and backward directions of the vehicle. The control unit 110 calculates the vehicle position, orientation, speed, and the like based on output signals from these sensors.

The map data input device 165 is supplied with various data from a map data storage medium (not shown) such as a hard disk and DVD-ROM. The map data storage medium stores map data (node data, link data, cost data, background data, road data, name data, mark data, intersection data, facility data, and the like), audio data for guidance, voice recognition data, and the like. These data may be supplied via a network instead of using the map data storage medium.

The control unit 110 chiefly includes a known microcomputer composed of a CPU, ROM, RAM, SRAM, I/O, and a bus line connecting these components. The control unit 110 performs various processes based on programs stored in the ROM and the RAM. To control the meters, for example, the control unit 110 receives data from various ECUs via the interior LAN communication unit 115. Based on the data, the control unit 110 drives needles of the speed meter 131a, the tachometer 131b, the fuel meter 131c, and the coolant temperature meter 131d. Further, the control unit 110 turns on or off the needle light source 136, the dial light source 137, and the warning indicator light source 135. As an example of controlling the navigation, the control unit 110 calculates the vehicle's current position as a set of coordinates and a traveling direction based on signals detected by the position detector 164. The then allows the TFT display device 132 to display a map and the like near the current position read through the map data input device 165. As another example, the control unit 110 performs a route calculation process to calculate an optimum route from the current position to a destination based on map data and the destination. The map data is stored in the map data input device 165. The destination is determined in accordance with operations of the operation switch group 161. As still another example, the control unit 110 performs a route guidance process to guide the route by allowing the TFT display device 132 to display the calculated route.

Further, the control unit 110 is connected with the ACC switch 3 and IGN switch 5. When the ACC switch 3 is turned on, each component of the vehicle display apparatus 1 becomes ready for operation.

(Description of Operations and Effects)

Operations of the vehicle display apparatus 101 will be described with reference to a time chart in FIG. 9. When the driver operates the ignition key to turn on the ACC switch 3 (i.e., to enter an ACC power supply state) (see (a) in FIG. 9), the components of the vehicle display apparatus 101 become ready for operation. The control unit 110 then turns on the TFT light source 125 (see (c) in FIG. 9) while starting to display a navigation image on the TFT display device 132 (see (d) in FIG. 9).

Figure 9:
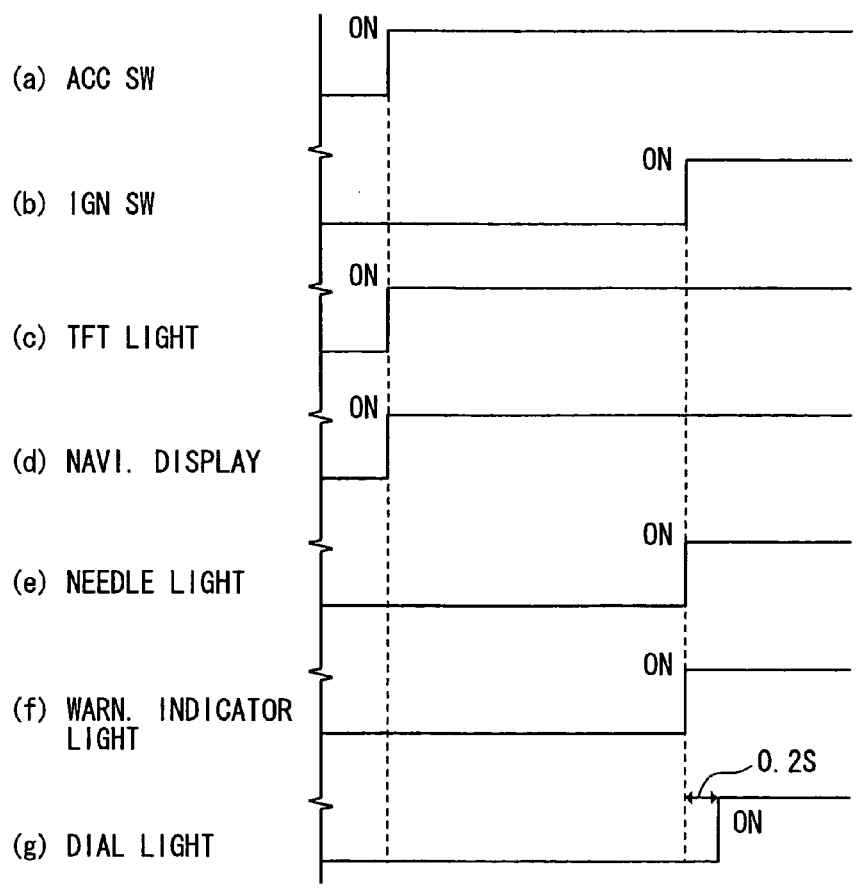
FIG. 9 is a time chart showing an operation of the vehicle display apparatus according to the second embodiment.

When the driver further operates the ignition key to turn on the IGN switch 5 (see (b) in FIG. 9), the control unit 110 turns on the needle light source 136 and warning indicator light source 135 (see (e) and (f) in FIG. 9). The control unit 110 keeps the needle light source 136 turned on for a specified time period (e.g., 0.2 seconds), and then turns on the dial light source 137 (see (g) in FIG. 9). That is, only the needles light for the speed meter 131a, the tachometer 131b, the fuel meter 131c, and the coolant temperature meter 131d. After lapse of the specified time period (e.g., 0.2 seconds), the dials or dial plates light.

Thus, a navigation image is displayed on the TFT display device 132 in the state where an ignition key is inserted in a key cylinder and rotated to turn on the ACC switch 3. Thus, a navigation image can be displayed to designate a destination to set a route for a route guidance or a detailed map can be displayed. Here, the driver can perform an operation for designating a destination or for enlarging or reducing map scales via the operation switch group 161. In this operation, it is favorable that the driver can pay more attention to the navigation image. Since no light sources 135, 136, and 137 for illuminating the meters 131a to 131d and warning indicators 133 are turned on at this timeframe, the driver can more attentively recognize the navigation image, which provides an advantage.

For instance, when setting the destination is completed and attending to the navigation image then becomes unnecessary, the driver may further rotate the ignition key to turn on the IGN switch 5 to view displays of the meters or the like. In other words, when a driver wants to attentively view a navigation image without turning on the light sources 135, 136, and 137 for the speed meter 131a, the tachometer 131b, the fuel meter 131c, the coolant temperature meter 131d, and the warning indicators 133, the driver only needs not to turn on the IGN switch 5.

With respect to the meters 131a to 131d, the control unit 110 turns on the needle light source 136 for a specified time period (e.g., 0.2 seconds), and then turns on the dial light source 137. In this manner, the control unit 110 first turns on the needles without the dials turned on, and then turns on the dials. This further enhances a visual effect and promotes the driver's concern for the meters 131a to 131d.

The control unit 110 once turns on the whole of the warning indicators 133 to check the initial state and turns off them thereafter unless actually needed. When the IGN switch 5 remains turned on for a specified time period (e.g., three seconds), the warning indicators 133 automatically turn off upon expiration of that time period. When the engine starts, the warning indicators 133 turn off. A known technique can be used to control the warning indicators 133 after the IGN switch 5 is turned on. This is not a mainstream of the invention and a detailed description is omitted.

(Modifications)

(1) The second embodiment is not connected to the navigation apparatus 50. Similarly to the first embodiment, the second embodiment may be connected to the navigation apparatus 50. Conversely, the vehicle display apparatus 1 according to the first embodiment can be used standalone not connected to the navigation apparatus 50.

(2) In the above explanation, a first trigger to perform a preferential display of a navigation image is turning on of the ACC switch 3, while a second trigger to turn on light sources 135 to 137 for the meters 131a to 131d and the warning indicators 133 is turning on of the IGN switch 5. However, as explained in "modifications" in the first embodiment, other switches such as a door switch or key insertion switch can substitute the ACC switch 3 or IGN switch 5.

Further, the second trigger can use a state that a specified instruction (e.g., indicating that setting a route is completed) is inputted via the operation switch group 161 similarly to the first embodiment.

Figure 5:
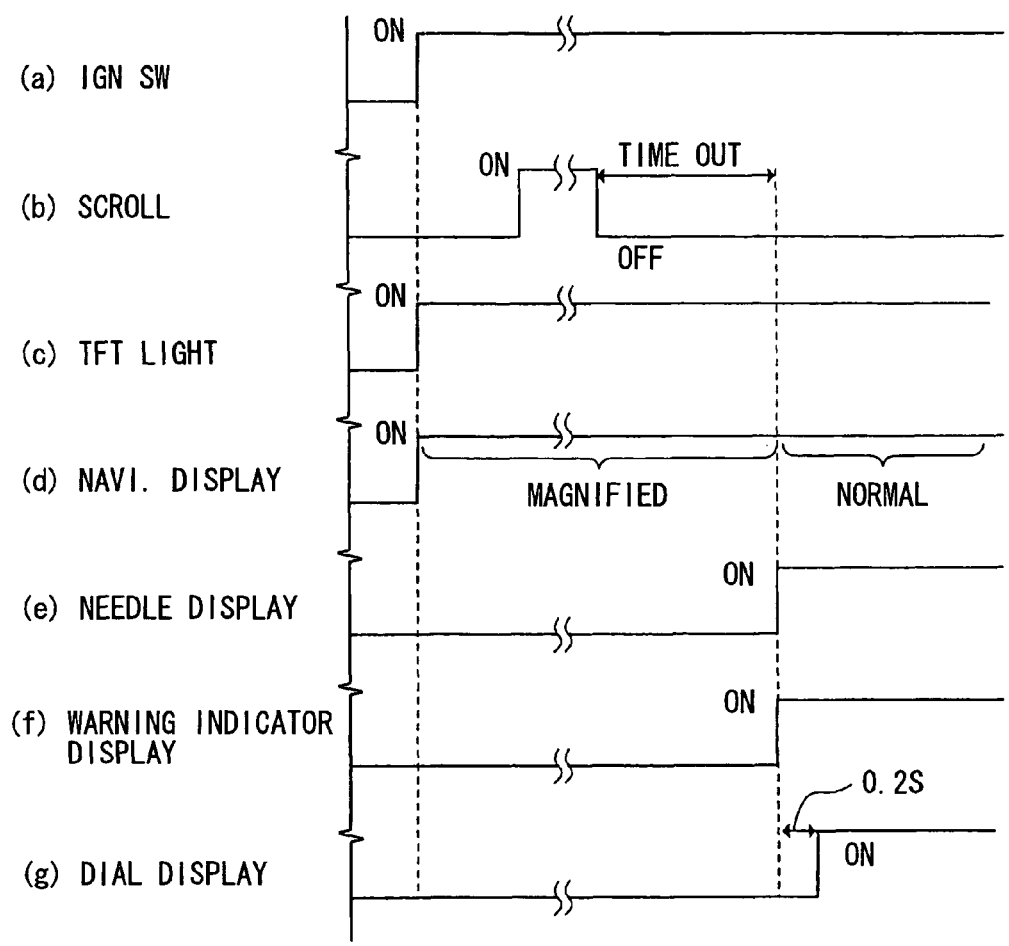
FIG. 5 is a time chart showing another operation of the vehicle display apparatus according to the first embodiment.

(3) Procedures explained in FIGS. 5 and 6 as modifications to the first embodiment can also apply as modifications of the second embodiment and produce the same effects as those in the modifications of the first embodiment.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A vehicle display apparatus comprising:
   display means that is provided in an instrument panel and includes
   (i) a navigation display area for displaying a navigation image and
   (ii) a meter display area for displaying a meter image; and
   control means that control a display operation according to a time chart, which defines displaying of images based on determining triggers in a time sequence so as to start to display the navigation image based on determining a first trigger, which is predetermined to appear when no navigation image and no meter image are displayed in the display means, and
   thereafter start to display the meter image while the navigation image remains displayed, based on determining a second trigger, which is predetermined to appear after the first trigger is determined,
   the control means being further configured to previously store the time chart defining the displaying of the navigation image and the meter image based on the determining the first trigger and the second trigger in time sequence.

2. The vehicle display apparatus of claim 1, further comprising:
   instruction accepting means for accepting an instruction from a user; and
   state detecting means for detecting a vehicle state, wherein
   the first trigger is determined when at least one of a first instruction determination and a first state determination is affirmed,
   the first instruction determination being whether the instruction accepting means accepts a first specified instruction,
   the first state determination being whether the state detecting means detects a first specified vehicle state, and wherein
   the second trigger is determined when at least one of a second instruction determination and a second state determination is affirmed,
   the second instruction determination being whether the instruction accepting means accepts a second specified instruction,
   the second state determination being whether the state detecting means detects a second specified vehicle state.

3. The vehicle display apparatus of claim 1, further comprising:
   navigation instruction accepting means for accepting from a user an instruction, which affects displaying of the navigation image, wherein
   the second trigger is determined when the navigation instruction accepting means accepts a specified instruction.

4. The vehicle display apparatus of claim 1, further comprising:
   navigation instruction accepting means for accepting from a user an instruction, which affects displaying of the navigation image, wherein
   the second trigger is determined when the navigation instruction accepting means accepts no instruction for a specified time period, which starts from when displaying the navigation image is started based on determining the first trigger.

5. The vehicle display apparatus of claim 1, wherein
   when the control means displays the navigation image without the meter image displayed, the navigation image is displayed in a magnified area of the navigation display area which is magnified from a normal area of the navigation display area, and
   when the control means displays the navigation image along with the meter image, the navigation image is displayed in the normal area.

6. The vehicle display apparatus of claim 5, wherein
   the navigation image, which is displayed in the magnified area, includes an image of a window for setting a route or an image of a detail map.

7. The vehicle display apparatus of claim 1, wherein
   the display means further includes a vehicle state display area for displaying a vehicle state image a user needs to confirm at initiation of power supply, and
   the control means displays the vehicle state image along with the navigation image.

8. A vehicle display apparatus comprising:
   display means that is provided in an instrument panel and includes
   (i) a navigation display area for displaying a navigation image and
   (ii) a meter display area for displaying a meter image; and control means that control a display operation according to a time chart, which defines displaying of images so as to
start to display the navigation image based on determining a first trigger, which is predetermined to appear when no navigation image and no meter image are displayed in the display means, and
thereafter start to display the meter image while the navigation image remains displayed, with an interval of a specified time period, which starts from when displaying the navigation image is started based on determining the first trigger,
the control means being further configured to previously store the time chart defining the displaying of the navigation image and the meter image.

9. The vehicle display apparatus of claim 8, further comprising:
instruction accepting means for accepting an instruction from a user; and
state detecting means for detecting a vehicle state, wherein
the first trigger is determined when at least one of a first instruction determination and a first state determination is affirmed,
the first instruction determination being whether the instruction accepting means accepts a first specified instruction,
the first state determination being whether the state detecting means detects a first specified vehicle state.

10. A vehicle display apparatus comprising:
a light source that is turned on for illuminating a mechanical meter provided in an instrument panel;
display means, which is provided in the instrument panel and includes a navigation display area for displaying a navigation image; and
control means that control a display operation according to a time chart, which defines displaying of the navigation image so as to
start to display the navigation image based on determining a first trigger, which appears when no navigation image is displayed without the light source turned on, and
thereafter turn on the light source while the navigation image remains displayed, based on determining a second trigger,
the control means being further configured to previously store the time chart defining the displaying of the navigation image.

11. The vehicle display apparatus of claim 10, further comprising:
instruction accepting means for accepting an instruction from a user; and
state detecting means for detecting a vehicle state, wherein
the first trigger is determined when at least one of a first instruction determination and a first state determination is affirmed,
the first instruction determination being whether the instruction accepting means accepts a first specified instruction,
the first state determination being whether the state detecting means detects a first specified vehicle state, and wherein
the second trigger is determined when at least one of a second instruction determination and a second state determination is affirmed,
the second instruction determination being whether the instruction accepting means accepts a second specified instruction,
the second state determination being whether the state detecting means detects a second specified vehicle state.

12. The vehicle display apparatus of claim 10, further comprising:
navigation instruction accepting means for accepting from a user an instruction, which affects displaying of the navigation image, wherein
the second trigger is determined when the navigation instruction accepting means accepts a specified instruction.

13. The vehicle display apparatus of claim 10, further comprising:
navigation instruction accepting means for accepting from a user an instruction, which affects displaying of the navigation image, wherein
the second trigger is determined when the navigation instruction accepting means accepts no instruction for a specified time period, which starts from when displaying the navigation image is started based on determining the first trigger.

14. The vehicle display apparatus of claim 10, further comprising:
a warning indicator light source that is turned on for illuminating a warning indicator in the instrument panel, wherein
the control means turns on the warning indicator light source while displaying the navigation image.

15. A vehicle display apparatus comprising:
a light source that is turned on for illuminating a mechanical meter provided in an instrument panel;
display means, which is provided in the instrument panel and includes a navigation display area for displaying a navigation image; and
control means that control a display operation according to a time chart, which defines displaying of the navigation image so as to
start to display the navigation image based on determining a first trigger, which appears when no navigation image displayed without the light source turned on, and
thereafter turn on the light source while the navigation images remains displayed, with an interval of a specified time period, which starts from when displaying the navigation image is started based on determining the first trigger,
the control means being further configured to previously store the time chart defining the displaying of the navigation image.

16. The vehicle display apparatus of claim 15, further comprising:
instruction accepting means for accepting an instruction from a user; and
state detecting means for detecting a vehicle state, wherein
the first trigger is determined when at least one of a first instruction determination and a first state determination is affirmed,
the first instruction determination being whether the instruction accepting means accepts a first specified instruction,
the first state determination being whether the state detecting means detects a first specified vehicle state.

17. The vehicle display apparatus of claim 1, further comprising:
instruction accepting means for accepting an instruction from a user; and
state detecting means for detecting a vehicle state, wherein the first trigger is determined when at least one of a first instruction determination and a first state determination is affirmed, the first instruction determination being whether the instruction accepting means accepts a first specified instruction, the first state determination being whether the state detecting means detects a first specified vehicle state, and wherein the second trigger is determined when a specified time period elapses after displaying the navigation image is started based on determining the first trigger.

18. The vehicle display apparatus of claim 1, further comprising:

a light source that is turned on for illuminating a mechanical meter provided in the instrument panel, wherein the control means starts to display the navigation image based on determining the first trigger, which appears when no navigation image and no meter image are displayed without the light source turned on, and thereafter turns on the light source based on determining a third trigger with an interval of a specified time period, which starts from when displaying the navigation image is started based on determining the first trigger.

19. The vehicle display apparatus of claim 18, further comprising:

instruction accepting means for accepting an instruction from a user; and state detecting means for detecting a vehicle state, wherein the first trigger is determined when at least one of a first instruction determination and a first state determination is affirmed, the first instruction determination being whether the instruction accepting means accepts a first specified instruction, the first state determination being whether the state detecting means detects a first specified vehicle state, and wherein the third trigger is determined when at least one of a third instruction determination and a third state determination is affirmed, the third instruction determination being whether the instruction accepting means accepts a third specified instruction, the third state determination being whether the state detecting means detects a third specified vehicle state.

20. The vehicle display apparatus of claim 1, further comprising:

a warning indicator light source that is turned on for illuminating a warning indicator in the instrument panel, wherein the control means turns on the warning indicator light source while displaying the navigation image.

21. A method for displaying images in an instrument panel in a vehicle, the method comprising:

storing a time chart, which defines displaying of images based on determining triggers in a time sequence, previously; and executing a display operation according to the previously stored time chart so as to display a navigation image in a navigation display area based on determining a first trigger, which is caused to appear when no navigation image and no meter image are displayed; and display a meter image in a meter display area while the navigation image remains displayed based on determining a second trigger that is caused to appear, with an interval of a specified time period, which starts from when displaying the navigation image is started based on determining the first trigger.

22. A vehicle display apparatus comprising:

a display device provided in an instrument panel including
(i) a navigation display area for displaying a navigation image and
(ii) a meter display area for displaying a meter image; and a control unit that controls a display operation according to a time chart, which defines displaying of images based on determining triggers in the time sequence so as to display the navigation image based on determining a first trigger, the navigation image being displayed without the meter image being displayed, and thereafter display the navigation image along with the meter image based on determining a second trigger, wherein when the control unit displays the navigation image without the meter image being displayed, the navigation image is displayed in a magnified area, the magnified area including the entirety of both the navigation display area and the meter display area, and when the control unit displays the navigation image along with the meter image, the navigation image is displayed in the navigation display area and the meter is displayed in the meter display area, the control unit being further configured to previously store the time chart defining the displaying of the navigation image and the meter image based on the determining the first trigger and the second trigger in the time sequence.

23. A vehicle display apparatus comprising:

a display device provided in an instrument panel including
(i) a navigation display area for displaying a navigation image and
(ii) a meter display area for displaying a meter image; and a control unit that controls a display operation according to a time chart, which defines displaying of images so as to display the navigation image based on determining a first trigger, the navigation image being displayed without the meter image being displayed, and thereafter display the navigation image along with the meter image after an interval of a specified time period, the specified time period starting when the navigation image is displayed based on determining the first trigger, wherein when the control unit displays the navigation image without the meter image being displayed, the navigation image is displayed in a magnified area, the magnified area including the entirety of both the navigation display area and the meter display area, and when the control unit displays the navigation image along with the meter image, the navigation image is displayed in the navigation display area and the meter is displayed in the meter display area, the control unit being further configured to previously store the time chart defining the displaying of the navigation image and the meter image.

24. A method for displaying a navigation image and a meter image in a display device in an instrument panel in a vehicle, the display device including a navigation display area and a meter display area, the method comprising:

storing a time chart, which defines displaying of images based on determining triggers in a time sequence, previously; and executing a display operation according to the previously stored time chart so as to display the navigation image based on determining a first trigger, the navigation image being displayed without the meter image being displayed; and display both the navigation image and the meter image based on determining a second trigger, which appears after the first trigger is determined, wherein displaying the navigation image without the meter image being displayed includes displaying the navigation image in a magnified area, the magnified area including both the entirety of the navigation display area and the meter display area, and displaying the navigation image along with the meter image includes displaying the navigation image in the navigation display area and displaying the meter in the meter display area.

25. The vehicle display apparatus of claim 1, wherein the first trigger is determined when an ignition key for starting an engine of the vehicle is rotated in a cylinder up to a first position while the second trigger is determined when the ignition key is further rotated from the first position up to a second position.

26. The vehicle display apparatus of claim 25, wherein:

when the ignition key is at the first position, an accessory switch is turned on; and when the ignition key is at the second position, an ignition switch is turned on.

27. The vehicle display apparatus of claim 1, wherein the first trigger is determined when an accessory switch is turned on to thereby enter an accessory power supply state; and the second trigger is determined when an ignition switch is turned on to thereby enter an ignition power supply state.

* * * * *